L. A. AVERY.
SAW GAGE AND JOINTER.
APPLICATION FILED APR. 17, 1918.
1,297,433.
Patented Mar. 18, 1919.
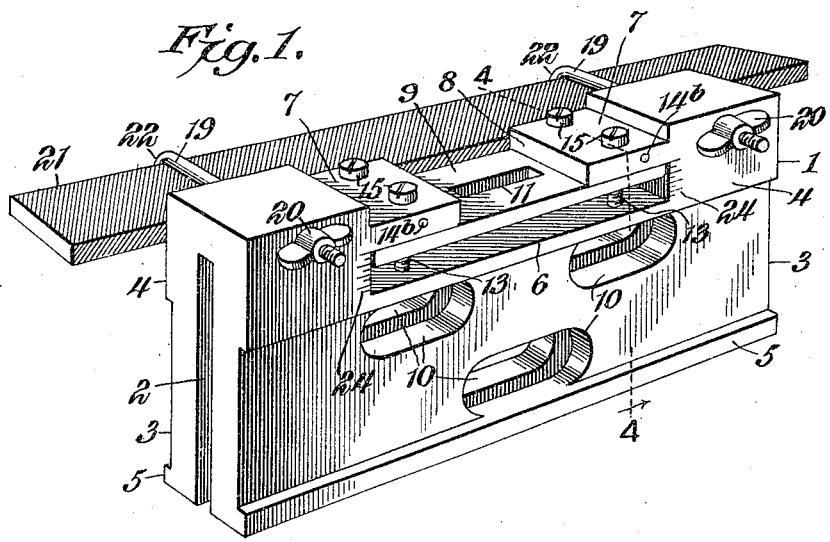
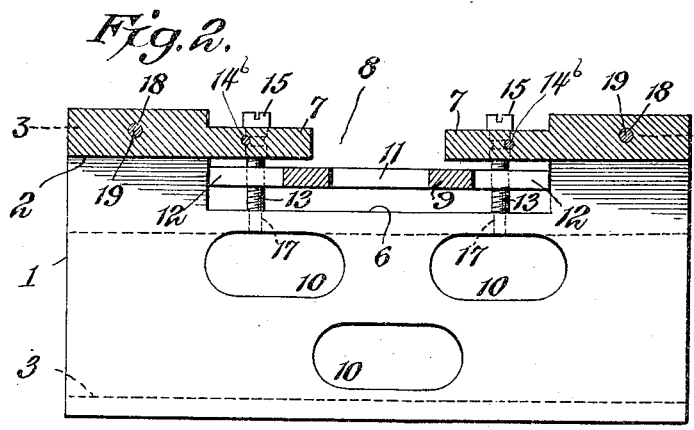
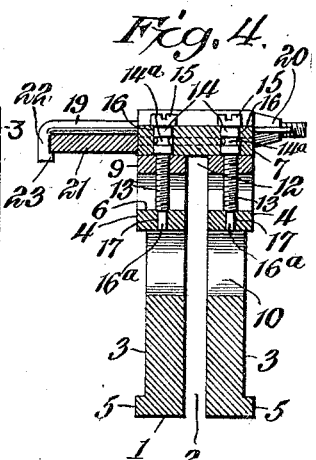
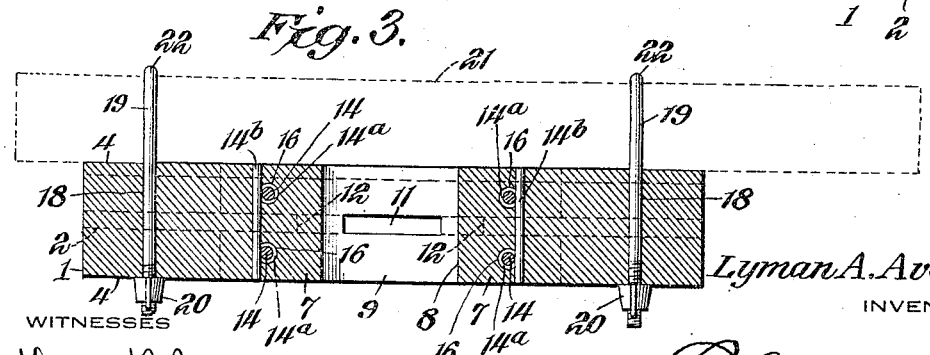
Lyman A. Avery,
INVENTOR,
WITNESSES
BY
ATTORNEY

UNITED STATES PATENT OFFICE.

LYMAN A. AVERY, OF GREEN LAKE, NEW YORK.

SAW-GAGE AND JOINTER.

1,297,433.

Specification of Letters Patent. Patented Mar. 18, 1919.

Application filed April 17, 1918. Serial No. 229,111.

*To all whom it may concern:*

Be it known that I, LYMAN A. AVERY, a citizen of the United States, residing at Green Lake, in the county of Fulton and State of New York, have invented a new and useful Saw-Gage and Jointer, of which the following is a specification.

This invention relates to saw gages and jointers.

The primary object is to combine in a single simple and compact device, means for quickly and accurately jointing the teeth of a cross-cut saw through the medium of a file held rigidly at right angles to the device by novel clamps, so that the said teeth may be uniformly filed to an even length, and means for gaging the raker teeth of such a saw so that they may bear the proper relation to the cutting teeth of the same.

Another object is to provide in such a device, means for a fine adjustment of the gage plate, in order to subject the raker teeth of the saw to just the right amount of filing, without the necessity of taking extreme care, after the said gage plate is properly set.

A further object is to construct a device of this character which is strong and durable and simple of operation, and which is easily applied to and held in position on the saw for such purposes, and may be readily operated by one unskilled in the art of filing saws.

A full and complete understanding of the invention may be obtained from a consideration of the following detailed description, taken in connection with the accompanying drawing, forming a part of this specification; it being understood that while the drawing shows a practical form of the invention, the latter is not confined to strict conformity therewith, but may be changed or modified, so long as such changes or modifications mark no material departure from the salient features of the invention, as specifically pointed out in the appended claims.

In the drawing, in which like reference characters designate like parts throughout the several figures;—

Figure 1 is a perspective view of the improved device, having a file held in proper position for jointing a saw;

Fig. 2 is a vertical longitudinal sectional view of the same with the gage plate adjusted;

Fig. 3 is a horizontal sectional view on the line 3—3 of Fig. 2;

Fig. 4 is a transverse, vertical section on the line 4—4 of Fig. 1.

The saw gage and jointer of the present invention comprises a body member 1, in the form of a block of suitable metal, as cast steel, having a vertically disposed, longitudinal kerf or slot 2, extending from the bottom to within a short distance of the top side thereof, forming opposite sides or wings, the top wall of the slot resting upon the teeth of the saw while gaging.

Each side of the body member 1 is provided on its exterior with a longitudinal channel 3, thus forming upper and lower spaced bearing surfaces 4 and 5, respectively, for a purpose to be later explained.

The central portion of the top of the body member is cut away to provide a recess 6, which extends down somewhat below the upper end of the kerf or slot 2, and inwardly directed, opposed arms 7—7 are formed integrally with the terminal portions of the said body member and have their under faces in alinement with and forming continuations of the upper end walls of the said kerf, and are spaced from the bottom wall of said recess, as clearly illustrated in Fig. 2 of the drawing.

The space 8, between the inner opposed terminals of the arms 7—7, is ample to permit of the transverse manipulation of an ordinary flat file for the purpose of treating the raker teeth of a saw as will be hereinafter fully described, and the space between the lower faces of the said arms 7—7 and the bottom wall of the recess 6, is ample for the upward and downward adjustment of the gage plate 9, which is adapted to regulate the amount of filing necessary to properly gage the said teeth.

Transverse openings 10 are formed in the walls of the body member upon either side of the central kerf or slot for the purpose of lightening the structure, and it will be seen that the device, thus far described, is capable of being manufactured from a single piece or casting, being properly machined to smooth the surfaces and that the same may be produced at a low cost.

The gage plate 9 is of a width equal to the width of the body member 1, and of a length substantially coextensive with the length of the recess 6, and is provided with a central, longitudinal slot 11, and terminal slots 12—12, alined with the central slot, and extending to the ends of the said plate, as clearly shown in Fig. 2, said slots providing for the reception of the teeth of the saw.

Screws 13, traversing suitable threaded apertures formed in the terminal portions of the gage plate 9, upon either side of the terminal slots 12 therein, are adapted to be regulated to adjust the gage plate to any desired elevation with relation to the bottom of the recess 6. These screws are provided with enlarged portions 14, adjacent to their slotted heads 15, and passed through suitable smooth apertures 16 formed in the arms 7—7 and in alinement with the aforesaid apertures in the adjustable gage plate 9, which are adapted to receive the reduced threaded portions of the screws 13. The lower terminals of the screws are further reduced, as at 16ª, and are adapted to be seated in suitable apertures 17 formed in the bottom wall of the recess 6 of the body member 1.

The upper enlarged portions of the screws 13, adjacent to their heads, and traversing the arms 7, 7, are provided with circumferential grooves 14ª, which are located at substantially the middle of the said arms, when the heads of the screws are contacting with and resting on the upper face of the arms. Transversely disposed pins 14ᵇ are inserted in suitable horizontally disposed apertures formed in the arms, and traverse the aforementioned circumferential grooves 14ª in the screws on that side adjacent to the ends of the body member, and act to retain the screws in position with the arm 7—7, while permitting of their being turned in either direction to raise or lower the gage plate.

The body member is provided near its terminals and adjacent to the top thereof, with horizontally disposed, transverse bores 18 for the reception of clamping bolts 19, which are smooth throughout the major portion of their lengths, and have one end threaded for the reception of thumb-nuts 20, which are adapted to bear against the adjacent side of the body member, when screwed up, to effect a longitudinal movement of the said bolts in order to clamp a file 21.

The other ends of the clamping bolts 19 are each bent at right-angles, as at 22, to form hooks for engaging over the edge of the file 21, as clearly shown in Fig. 4, and the ends of said hook portions are provided with terminal lugs 23, extending under the lower face of said file, to prevent the turning of the clamp bolts within their seats and thus becoming disengaged from the file, as will be clearly understood.

Upon either face of the body member 1, at each end of the recess 6, and opposite the ends of the gage plate, graduations 24 are provided, which may be formed by stamping in the metal thereof by means of which the gage plate may be uniformly adjusted by manipulating the four screws 13.

In the operation of the device for what is known as jointing a saw, any flat file of varying widths within certain limits is fitted within the recess formed by the terminal lug 23 provided in the downturned portion 22 of the clamping screws 19, and bearing against the flat face 4 of the body member, above the side channel 3, when the two thumb nuts 20 are tightened to hold the same in place. The said file is then accurately positioned at right angles to the body member and bearing against the undersides of the clamping bolts, the top of the file being embraced by the bolts and the two edges being engaged respectively by the portions 22 of the bolts and the side of the body. By placing the device in position upon the saw, with the upturned teeth thereof beneath the file and the side of the saw bearing against the upper and lower bearing surfaces 4 and 5, respectively, the device may be reciprocated back and forth to bring all of the teeth of the saw to uniform length, in a well-known manner, and the same are filed square, with relation to the sides of the saw.

The file and the body member form an exact right angle, and by placing the body member against the saw and holding it firmly, there is no chance of cutting one side of the teeth lower than the other, as is the case with some jointers.

In the operation of gaging the saw, the saw is placed within the central slot or kerf 2, the top wall of which rests on the teeth, with the raker tooth extending upwardly through the slot 11 of the gage plate 9, which is adjusted by the screws to the desired extent, when the tooth may be appropriately filed by a manipulation of the proper file transversely of the device and between the ends of the arms 7—7, even with the top of the gage plate, the latter being preferably formed of steel, case-hardened, to withstand the inroads of the said file.

To ascertain how much of the raker tooth is being cut down, one need only measure the space between the underside of the arms 7, and the gage plate, this being shown by the gage marks 24. The ends of the gage plate move in close juxtaposition to the end walls of the recess on which said marks are placed.

From the foregoing, it will be seen that a simple, cheap and durable device has been provided for the operations of jointing and gaging a saw, which may be easily operated by one unskilled in the art of filing saws, and that the fine adjustment of which the gage plate is capable permits of great accuracy in the latter operation. Moreover, there is no chance of the tool wabbling as it rests down over and upon the saw.

What is claimed is—

1. A saw gage comprising a metallic body member having a central longitudinal, vertically-disposed slot extending from its bottom to near its top, for receiving a saw for gaging, the upper wall of the slot adapted to rest upon the saw teeth, said body member having a central recess formed in its upper side and intersecting the said slot, arms formed integrally with the body member and extending into the recess toward the center thereof, a gage plate loosely mounted for upward and downward movement in the recess between the bottom thereof and the said arms, and substantially coextensive with the length and width of said recess, screws traversing the arms and rotating therein and having threaded engagement with the plate, said plate having a central slot for receiving a raker tooth of a saw for gaging the same, and having its ends moving in juxtaposition with the opposite end walls of said recess, and graduations on said end walls to determine the adjustment of said plate.

2. A saw gage comprising a body member composed of a single elongated casting provided with a vertically-disposed central kerf or slot adapted to straddle a saw for gaging, the upper wall of the slot adapted to rest upon the teeth of the saw, a central recess formed in the upper side of the member and intersecting the said slot, inwardly directed integral arms extending into the recess and spaced from the bottom wall of said recess, a gage plate arranged within the recess below the arms for up-and-down movement, vertically-disposed adjusting screws traversely the said arms and having threaded engagement with the gage plate, the lower ends of the screws being seated in the bottom wall of said recess, the upper ends of the screws where traversing the said arms being unthreaded and provided with circumferential grooves, and transversely disposed pins traversing the said arms in a horizontal plane and intersecting the grooves in the screws to prevent their upward or downward movement while turning the same for adjusting the gage plate.

3. In a saw jointer, a body member having a horizontally-disposed channel formed in the outer side between the top and bottom, said channel defining upper and lower bearing surfaces, horizontally-disposed clamping bolts provided in the ends of said member above the upper bearing surface, said bolts being provided with thumb nuts threaded on one of their ends, and having at their other ends hooks provided with terminal lugs, which are adapted to engage under the lower face of a file, the latter being embraced at its upper face by the bolts and being held with its inner edge bearing directly against the body member, whereby the file is held at exactly right angles to the body member.

In testimony, that I claim the foregoing as my own, I have hereto affixed my signature in the presence of two witness.

LYMAN A. AVERY.

Witnesses:
 WILLIAM AVERY,
 JAMES WALSH.

Copies of this patent may be obtained for five cents each, by addressing the "Commissioner of Patents, Washington, D. C."